US012721777B2

(12) United States Patent
Zhou et al.

(10) Patent No.: US 12,721,777 B2
(45) Date of Patent: Sep. 1, 2026

(54) THREE-SECTION GUIDE RAIL STRUCTURE FOR MASSAGE CHAIR

(71) Applicant: ZHEJIANG HAOZHONGHAO HEALTH PRODUCT CO., LTD., Wenzhou (CN)

(72) Inventors: Guohai Zhou, Wenzhou (CN); Qing Chen, Wenzhou (CN)

(73) Assignee: ZHEJIANG HAOZHONGHAO HEALTH PRODUCT CO., LTD., Wenzhou (CN)

( * ) Notice: Subject to any disclaimer, the term of this patent is extended or adjusted under 35 U.S.C. 154(b) by 245 days.

(21) Appl. No.: 18/257,502

(22) PCT Filed: Jan. 4, 2022

(86) PCT No.: PCT/CN2022/070129
§ 371 (c)(1),
(2) Date: Jun. 14, 2023

(87) PCT Pub. No.: WO2023/060787
PCT Pub. Date: Apr. 20, 2023

(65) Prior Publication Data

US 2024/0033165 A1 Feb. 1, 2024

(30) Foreign Application Priority Data

Oct. 12, 2021 (CN) ......................... 202122463373.0

(51) Int. Cl.
*A61H 15/00* (2006.01)

(52) U.S. Cl.
CPC . *A61H 15/0078* (2013.01); *A61H 2201/0149* (2013.01)

(58) Field of Classification Search
CPC .............. A61H 2201/0149; A61H 1/00; A61H 15/0078
See application file for complete search history.

(56) References Cited

U.S. PATENT DOCUMENTS

2012/0212018 A1* 8/2012 Ishikawa .............. A61H 23/006 297/217.1
2015/0157528 A1* 6/2015 Le ........................ A61H 23/006 601/99

(Continued)

FOREIGN PATENT DOCUMENTS

CN 107007438 8/2017
CN 208926950 6/2019

(Continued)

OTHER PUBLICATIONS

International search report of PCT/CN2022/070129.

*Primary Examiner* — Brandy S Lee
*Assistant Examiner* — Rohan Patel
(74) *Attorney, Agent, or Firm* — Hemisphere Law, PLLC

(57) ABSTRACT

The application relates to a three-section guide rail structure for a massage chair includes a backrest guide rail, a transition guide rail, and a seat guide rail. The transition guide rail is hinged and matched with both the backrest guide rail and the seat guide rail, and each rail has a toothed rack. A first pressing strip is fixed to the backrest guide rail and extends into the transition guide rail, while a second pressing strip is fixed to the seat guide rail and extends into the transition guide rail. This structure makes it easier for the massage mechanism to move between the backrest guide rail and the seat guide rail during the process of lying or lifting the seat.

9 Claims, 9 Drawing Sheets

(56) References Cited

U.S. PATENT DOCUMENTS

| | | | |
|---|---|---|---|
| 2015/0297441 | A1 | 10/2015 | Wang et al. |
| 2018/0185234 | A1 | 7/2018 | Ishiguro et al. |

FOREIGN PATENT DOCUMENTS

| | | | | | |
|---|---|---|---|---|---|
| CN | 208926950 | U | * | 6/2019 | |
| CN | 209019340 | | | 6/2019 | |
| CN | 110859729 | A | * | 3/2020 | ............... A61H 1/00 |
| CN | 110916993 | A | * | 3/2020 | ............. A61H 7/003 |
| KR | 20200145194 | A | | 12/2020 | |

* cited by examiner

THREE-SECTION GUIDE RAIL STRUCTURE FOR MASSAGE CHAIR

TECHNICAL FIELD

The present application relates to the technical field of a massage chair, and more particularly, to a three-section guide rail structure of a massage chair.

BACKGROUND

The existing massage chair includes a backrest skeleton, a chair skeleton, and a base. The backrest skeleton and chair skeleton are installed on the base. In order to allow the seat to lie flat, the backrest skeleton is hinged on the chair skeleton. A back guide rail is arranged on the backrest skeleton for a massage mechanism to move, and a seat guide rail on the chair skeleton for the massage mechanism to move. Due to the sectional setting of the back guide rail and seat guide rail, there is a certain gap between the two when the back skeleton rotates, though ensuring that the massage mechanism can move smoothly without interference between the back rail and seat guide rail, it is not convenient for the massage mechanism to move between the back rail and the seat rail.

SUMMARY OF THE INVENTION

The present application overcomes the shortcomings of the prior art and provides a three-section guide rail structure for a massage chair. The structure adopts three guide rails, which facilitates the movement of the massage mechanism between the backrest guide rail and the seat guide rail during the process of lying or lifting the seat.

The technical solution adopted by the present application to achieve the above objectives is a three-section guide rail structure for a massage chair, comprising a backrest guide rail, a transition guide rail, and a seat guide rail. One end of the transition guide rail is hinged and matched with the backrest guide rail, and the other end of the transition guide rail is hinged and matched with the seat guide rail. The backrest guide rail is provided with a backrest toothed rack, the transition guide rail is provided with a transition toothed rack, and the seat guide rail is provided with a seat toothed rack. The hinge point between the backrest guide rail and the transition guide rail is located on the reference line between the backrest toothed rack and the transition toothed rack, and the hinge point between the seat guide rail and the transition guide rail is located on the reference line between the seat toothed rack and the transition toothed rack. The backrest guide rail is fixedly provided with a first pressing strip, which extends into the transition guide rail, and the seat guide rail is fixedly provided with a second pressing strip, which extends into the transition guide rail.

By adopting the above scheme, the three-section guide rail structure of the backrest guide rail, transition guide rail, and seat guide rail is established, and two hinge points are set for hinging. The seat guide rail does not flip, while the backrest guide rail and transition guide rail can be flipped to achieve the flat or lifting of the entire guide rail, and can be adjusted to any angle. The hinge points are set on the reference lines of each toothed rack, and the backrest toothed rack, transition toothed rack, and seat toothed rack always correspond when the backrest guide rail and transition guide rail flip, ensuring smooth engagement between the massage mechanism and each toothed rack. When the massage mechanism travels to the joint of each guide rail, the first pressure bar and the second pressure bar play a limiting role, which is used to press the massage rollers on both sides of the massage mechanism to prevent the massage mechanism from jumping at the joint of the guide rail, and make the traveling of the massage mechanism more stable. Therefore, the three-section guide rail is adopted to facilitate the traveling of the massage mechanism between the backrest guide rail and the seat guide rail during the process of the seat flat or lifting.

The further configuration of the present application is as follows: the backrest guide rail is articulated and matched with the transition guide rail through a first flat shoulder screw and a first nut, and the first flat shoulder screw is circumferentially positioned and installed on the backrest guide rail. The first flat shoulder screw passes through the transition guide rail, and the first nut is rotatably mounted on the first flat shoulder screw to limit the transition guide rail from detaching from the first flat shoulder screw.

By adopting the above scheme, the backrest guide rail and the transition guide rail are articulated through the first flat shoulder screw as the hinge axis. After the first flat shoulder screw is installed, it can ensure that the first flat shoulder screw and the backrest guide rail are relatively fixed, facilitating the tightening of the first nut. The first nut and the first flat shoulder screw can cooperate to clamp and limit the backrest guide rail and the transition guide rail.

The further configuration of the present application is as follows: the seat guide rail is articulated and matched with the transition guide rail through a second flat shoulder screw and a second nut, and the second flat shoulder screw is circumferentially positioned and installed on the seat guide rail. The second flat shoulder screw passes through the transition guide rail, and the second nut is rotatably mounted on the second flat shoulder screw to limit the transition guide rail from detaching from the second flat shoulder screw.

By adopting the above scheme, the seat guide rail and the transition guide rail are articulated through the second flat shoulder screw as the hinge axis. After the second flat shoulder screw is installed, it can ensure that the second flat shoulder screw and the seat guide rail are relatively fixed, facilitating the tightening of the second nut. The second nut and the second flat shoulder screw can cooperate to clamp and limit the seat guide rail and the transition guide rail.

The further configuration of the present application is as follows: the backrest guide rail is provided with a first through-hole for the rod portion of the first flat shoulder screw to pass through, and the backrest guide rail is provided with a first positioning groove that is shaped to match the head of the first flat shoulder screw at the corresponding first through-hole. The head of the first flat shoulder screw is inserted into the first positioning groove to limit the first flat shoulder screw from rotating.

By adopting the above scheme, when the first flat shoulder screw is installed in place, the head of the first flat shoulder screw is inserted and matched with the first positioning groove, and the first flat shoulder screw cannot rotate, which is convenient for tightening the first nut. The structure is simple and the design is reasonable.

The further configuration of the present application is as follows: the seat guide rail is provided with a second through-hole for the rod portion of the second flat shoulder screw to pass through, and the seat guide rail is provided with a second positioning groove that is shaped to match the head of the second flat shoulder screw at the corresponding second through-hole. The head of the second flat shoulder screw is inserted into the second positioning groove to limit the second flat shoulder screw from rotating.

By adopting the above scheme, when the second flat shoulder screw is installed in place, the head of the second flat shoulder screw is inserted and matched with the second positioning groove, and the second flat shoulder screw cannot rotate, which is convenient for tightening the second nut. The structure is simple and the design is reasonable.

The further configuration of the present application is as follows: the outer side of the transition guide rail is fixedly connected with a support plate, one end of the support plate is provided with a first connecting portion, and the other end of the support plate is provided with a second connecting portion. The first connecting portion is sleeved on the rod portion of the first flat shoulder screw, and two first isolation pads are respectively sleeved on both sides of the first flat shoulder screw in the first connecting portion. The two first isolation pads are both circumferentially connected to the first connecting portion, and the first nut is pressed against the first isolation pad located on the outer side through a first gasket. The second connecting portion is sleeved on the rod portion of the second flat shoulder screw, and two second isolation pads are respectively sleeved on both sides of the second flat shoulder screw in the second connecting portion. The two second isolation pads are connected in a circumferential manner with the second connecting portion, and the second nut is pressed against the second isolation pad located on the outer side through a second gasket.

By adopting the above scheme, the first isolation pad is provided on both sides of the first connecting portion, which can reduce wear and tear, and the disassembly and assembly of the transitional rail and the backrest rail are convenient. The second isolation pad is provided on both sides of the second connecting portion, which can also reduce wear and tear, and the disassembly and assembly of the transitional rail and the seat rail are convenient.

The further configuration of the present application is as follows: one end of the transition guide rail is provided with a first contact surface and a second contact surface on the rotation trajectory of the backrest guide rail, and the first contact surface and the second contact surface respectively abut against the backrest guide rail. The other end of the transition guide rail is provided with a third contact surface and a fourth contact surface on the rotation trajectory of the seat guide rail, and the third contact surface and the fourth contact surface respectively abut against the seat guide rail.

By adopting the above scheme, during lying down, the backrest guide rail and the transition guide rail flip a certain angle relative to the seat guide rail as a whole until the fourth contact surface abuts against the seat guide rail, and then the backrest guide rail continues to flip a certain angle until the second contact surface abuts against the transition guide rail, and the backrest guide rail stops rotating, achieving the effect of overall lying down. During lifting, the backrest guide rail and the transition guide rail flip a certain angle relative to the seat guide rail as a whole until the third contact surface abuts against the seat guide rail, and then the backrest guide rail continues to flip a certain angle until the first contact surface abuts against the transition guide rail, and the backrest guide rail stops rotating, achieving the effect of overall lifting.

The following is a further description of the present application with reference to the attached drawings.

DESCRIPTION OF THE EMBODIMENTS

In the description of the present application, it should be understood that the terms “up”, “down”, “front”, “back”, “left”, “right”, “top”, “bottom”, “inside”, “outside”, etc. indicating the orientation or positional relationship are based on the orientation or positional relationship shown in the accompanying drawings, and are only for the convenience of describing and simplifying the description, and do not indicate or imply that the device or component referred to must have a specific orientation, be constructed and operated in a specific orientation, and therefore cannot be understood as limiting the present application.

Figure 1:
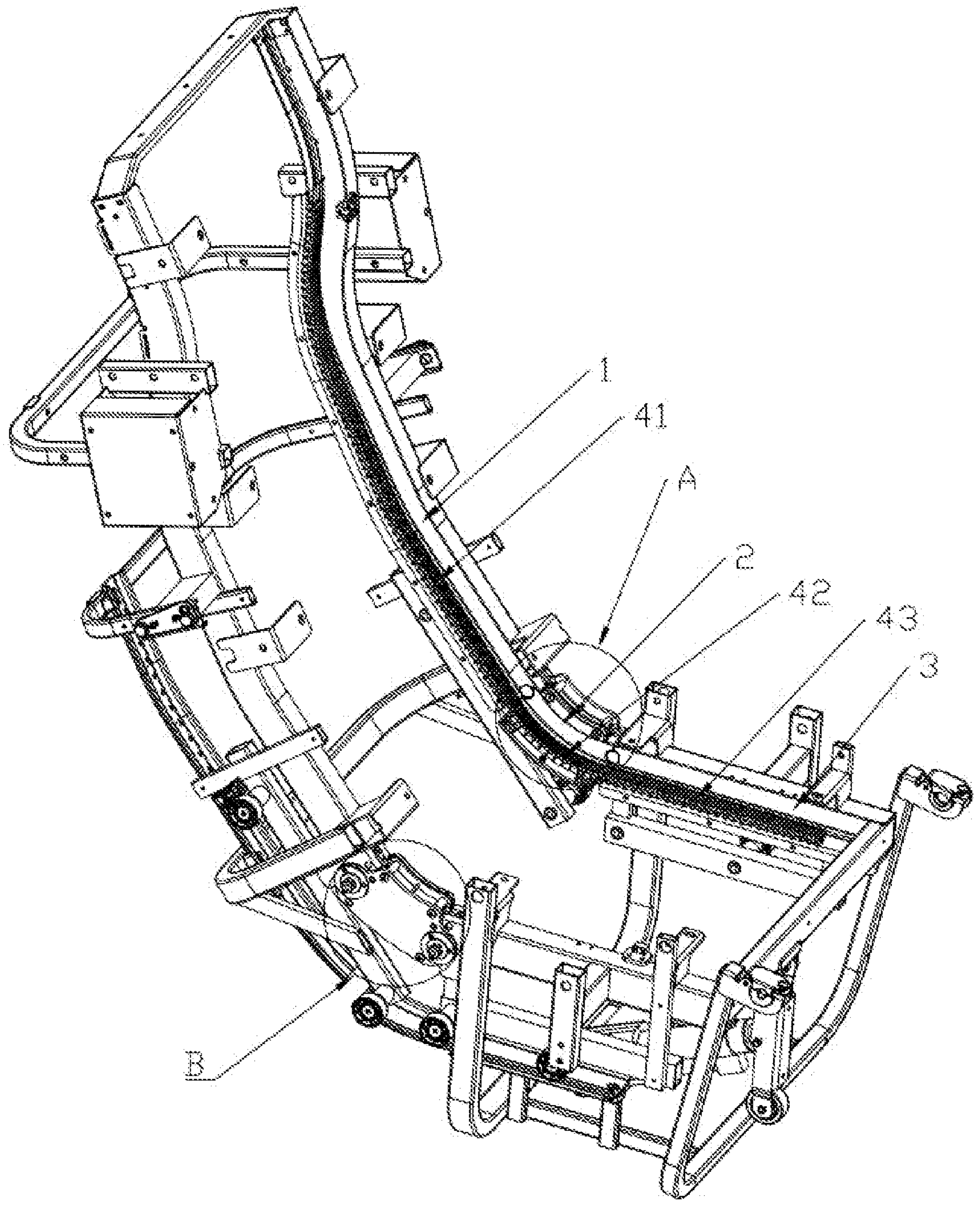
FIG. 1 is a schematic diagram of the lifting state.
Figure 2:
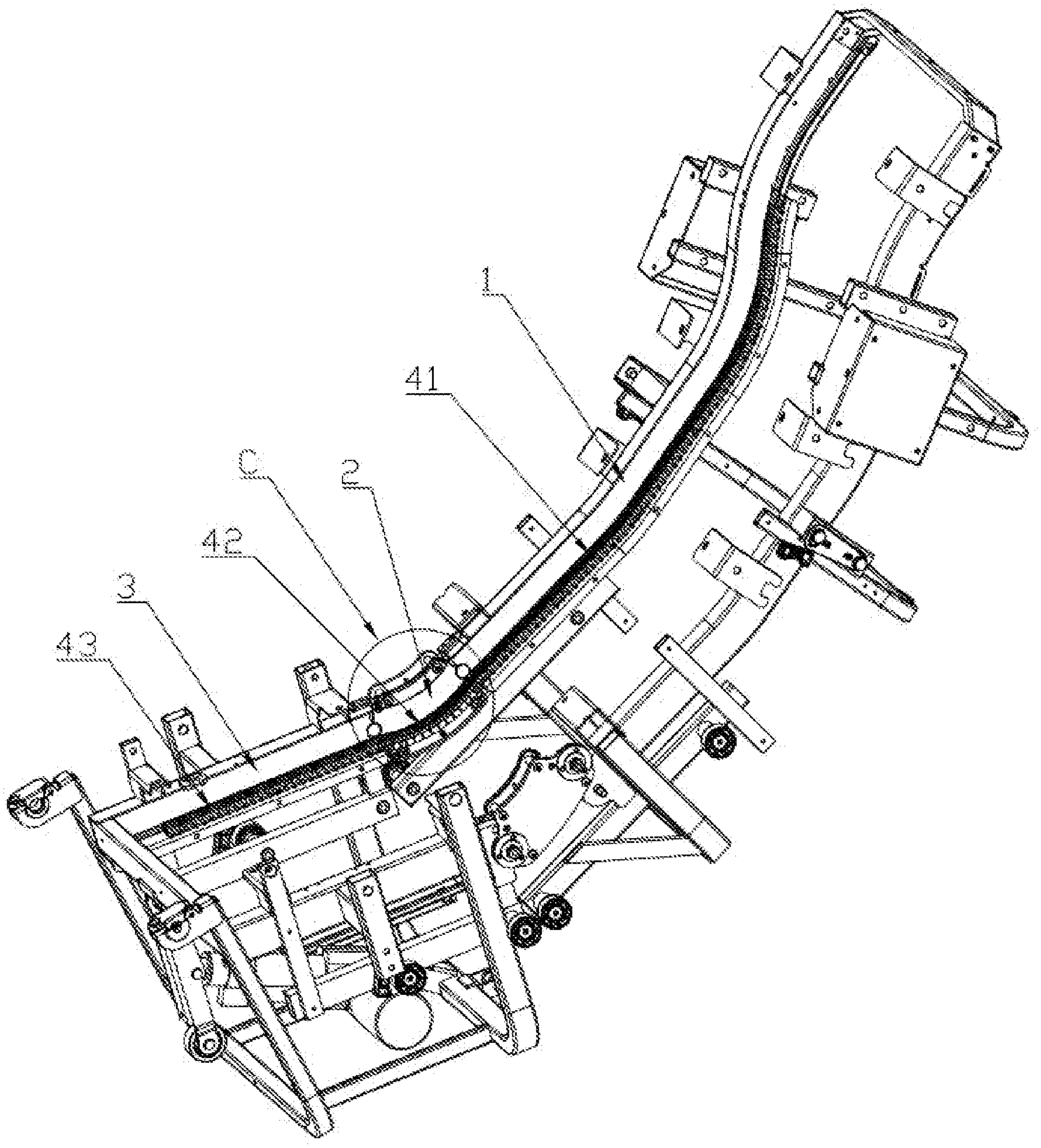
FIG. 2 is a schematic diagram of the lying state.
Figure 3:
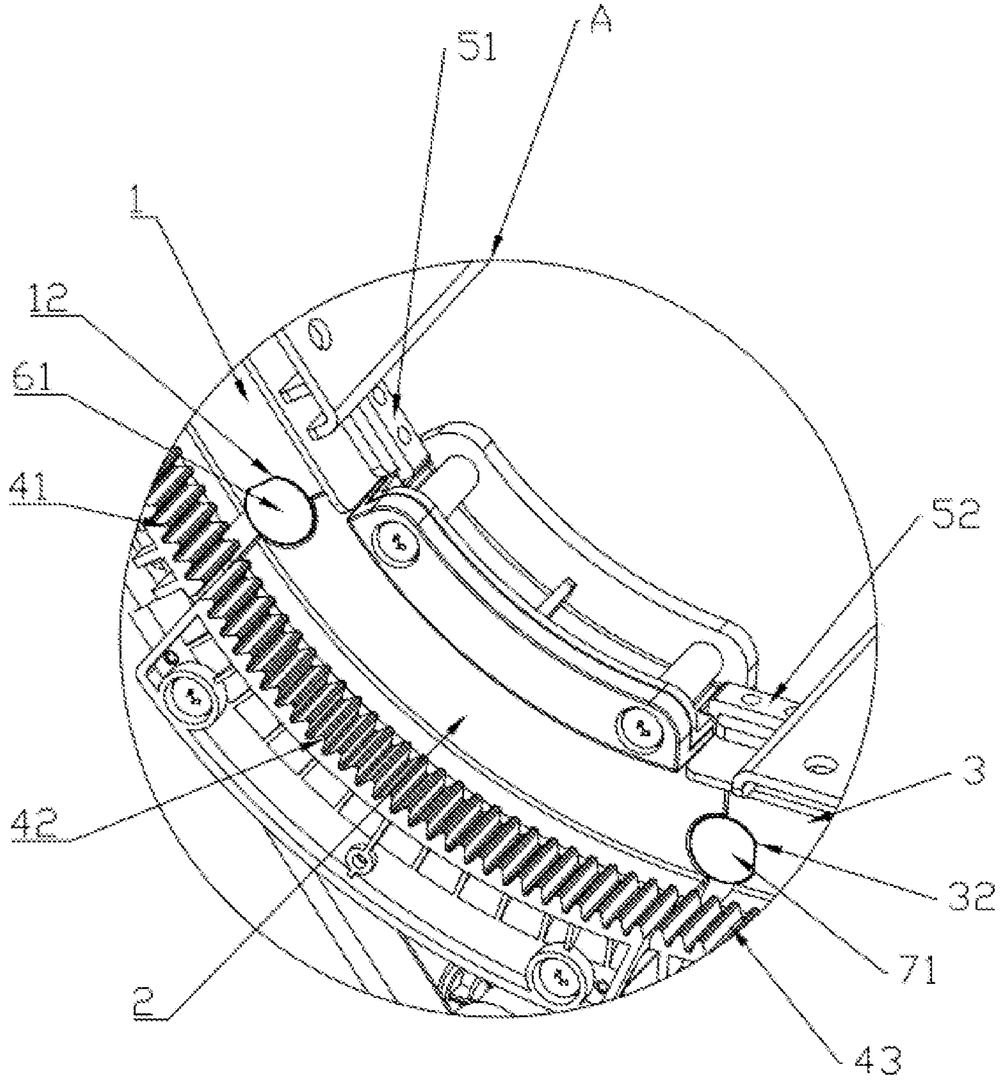
FIG. 3 is an enlarged schematic diagram of part A of FIG. 1.
Figure 4:
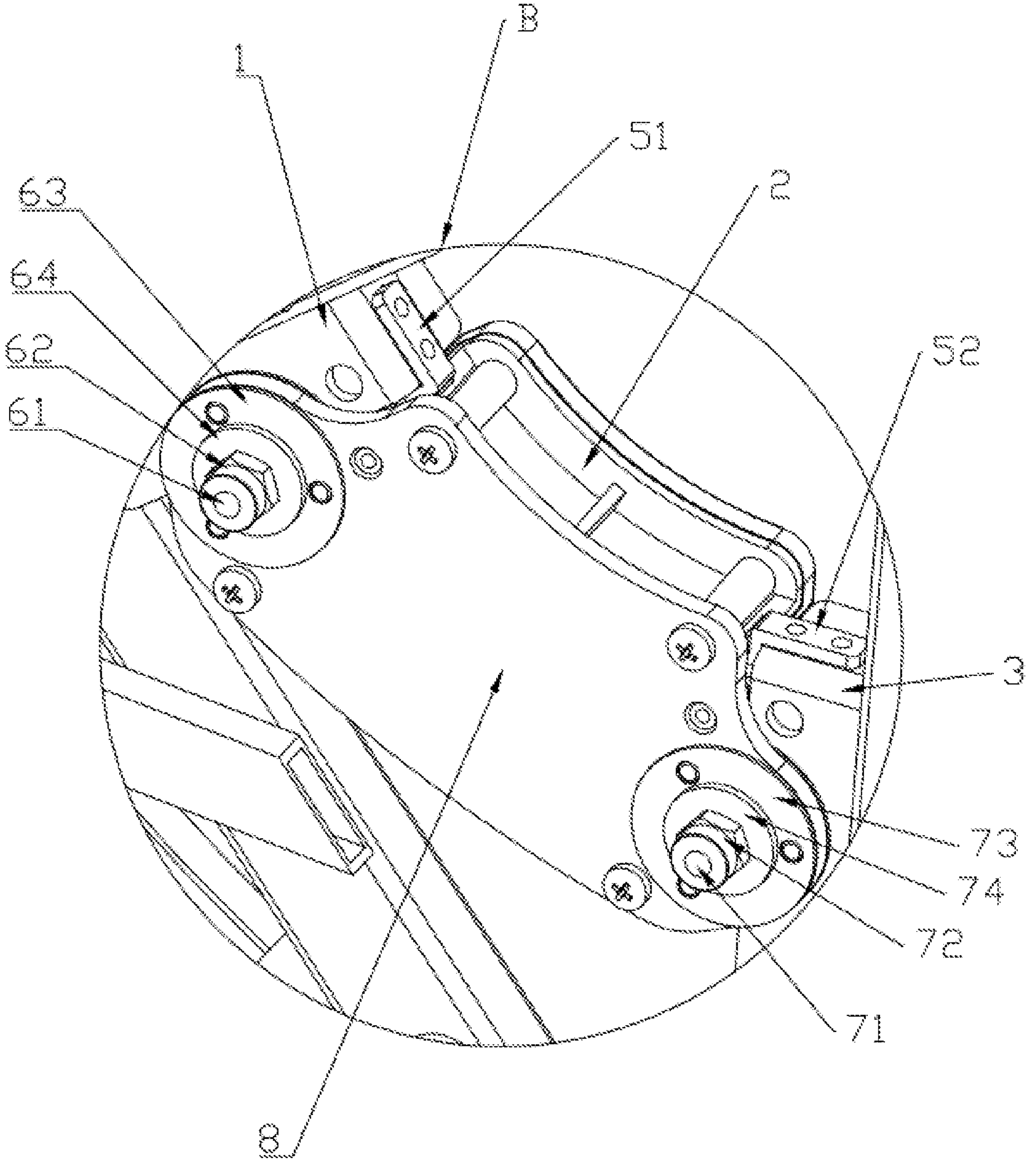
FIG. 4 is an enlarged schematic diagram of part B of FIG. 1.
Figure 5:
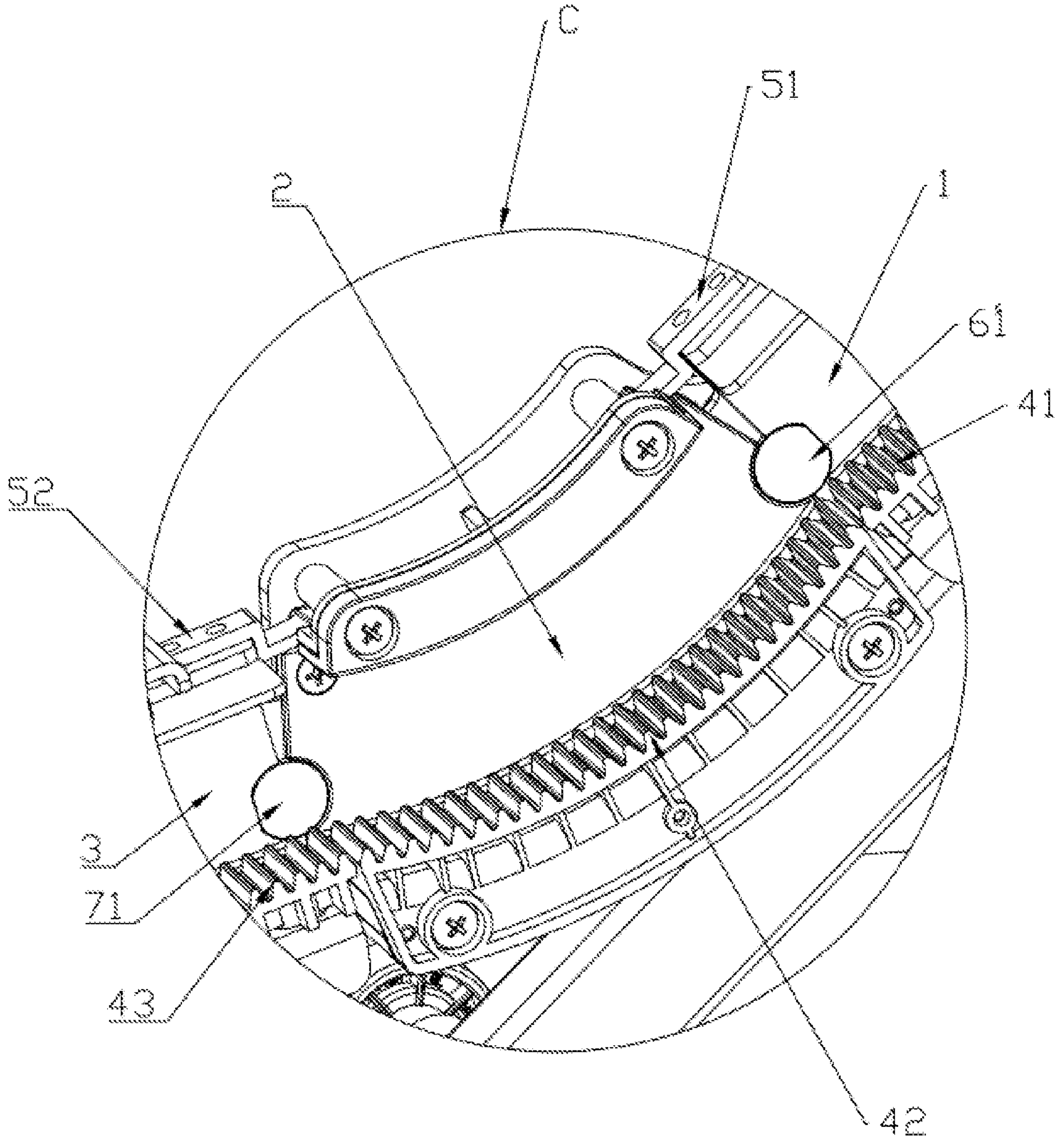
FIG. 5 is an enlarged schematic diagram of part C of FIG. 2.
Figure 6:
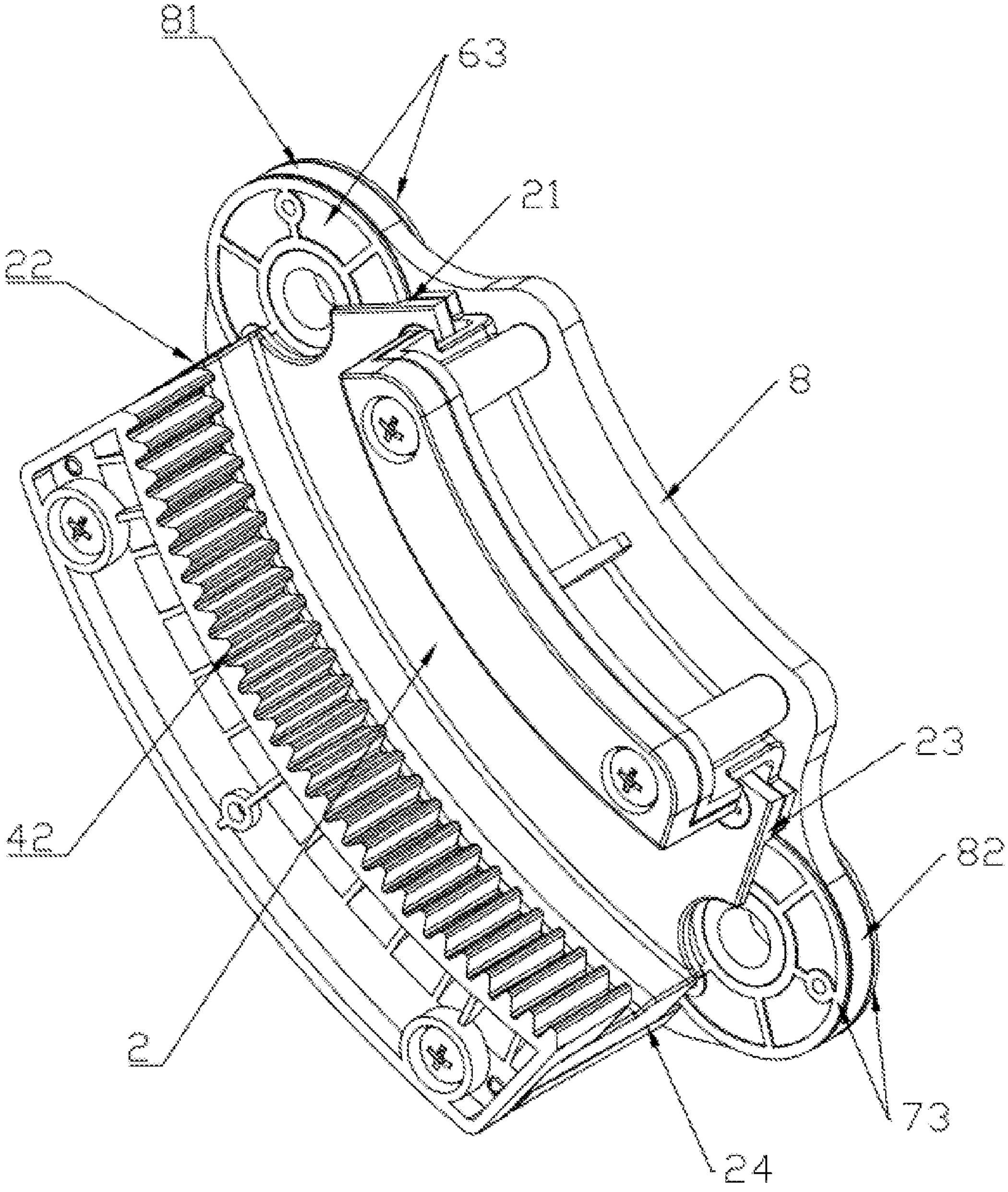
FIG. 6 is a schematic diagram of the structure of the transition guide rail.
Figure 7:
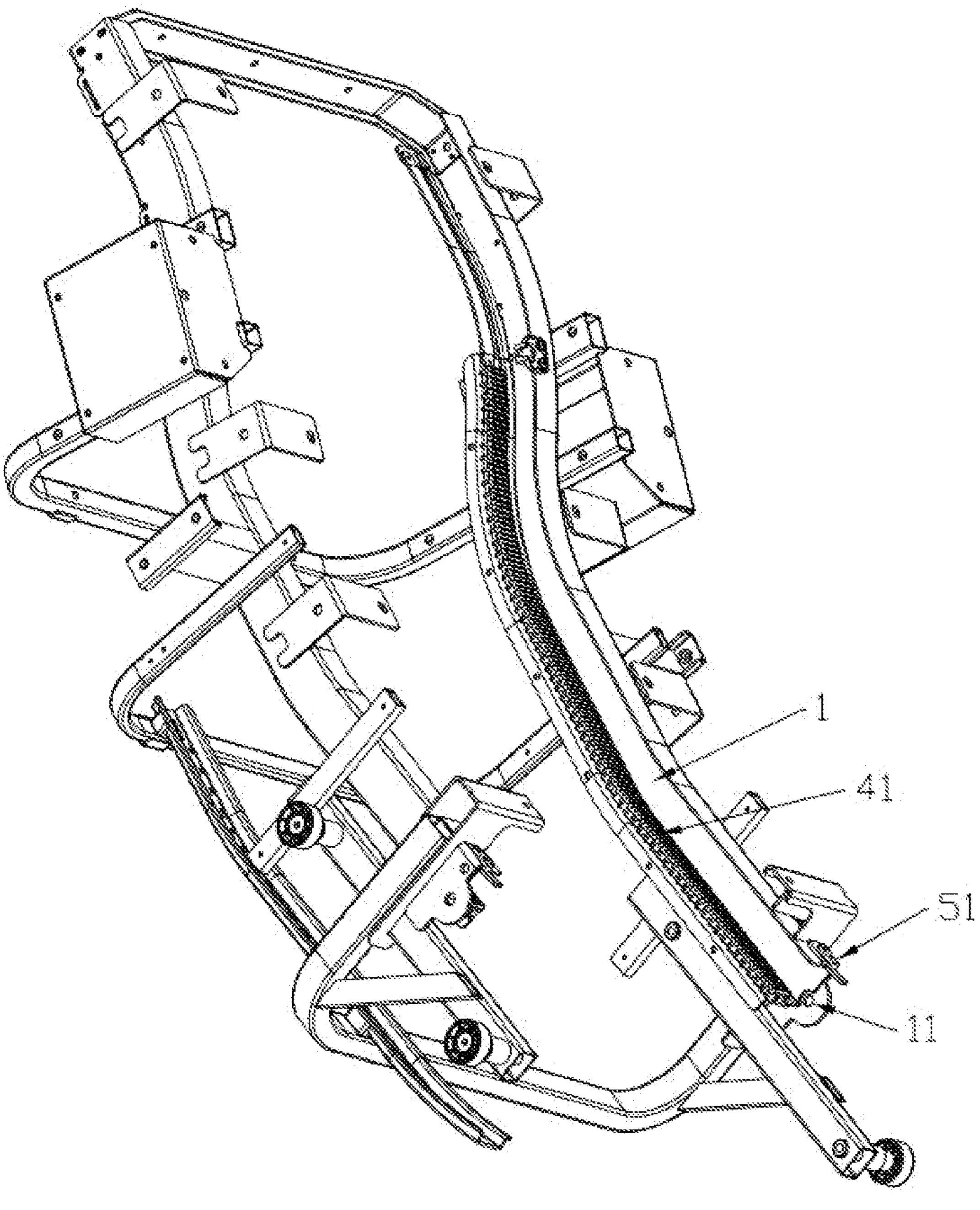
FIG. 7 is a schematic diagram of the structure of the backrest guide rail.
Figure 8:
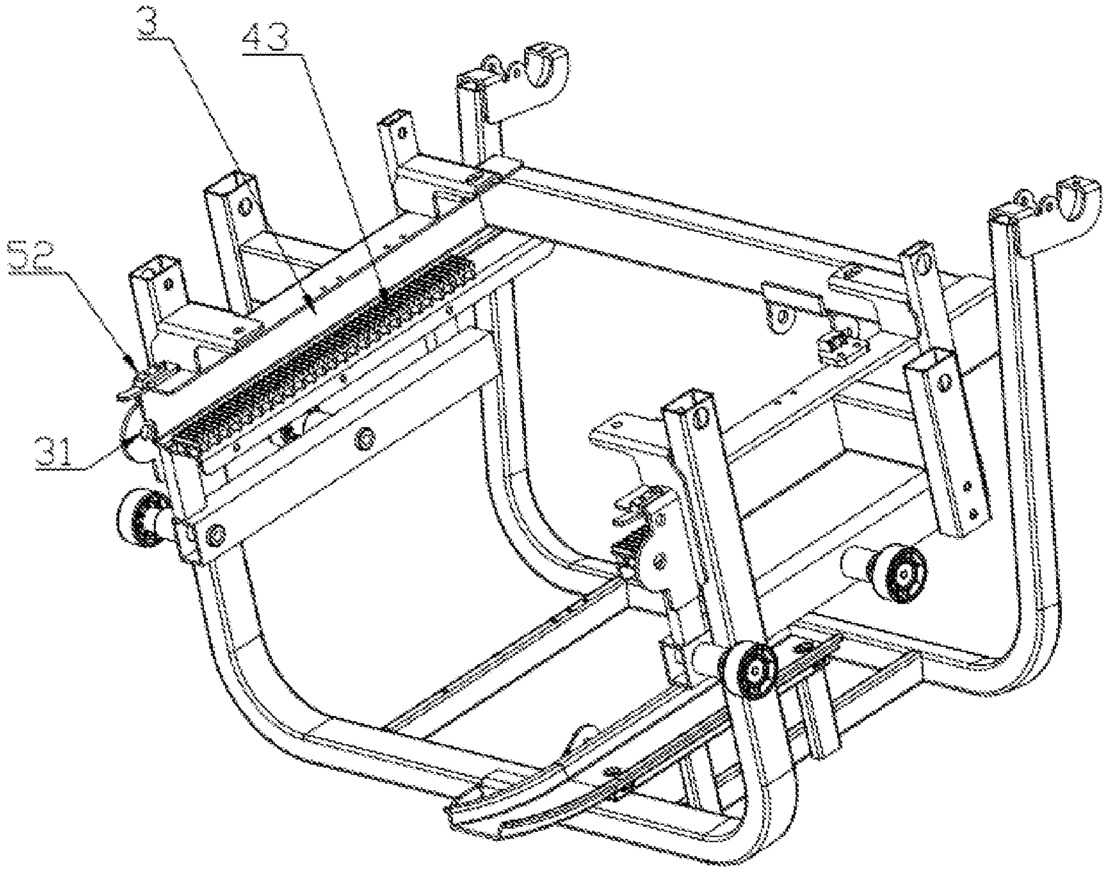
FIG. 8 is a schematic diagram of the seat guide rail structure.
Figure 9:
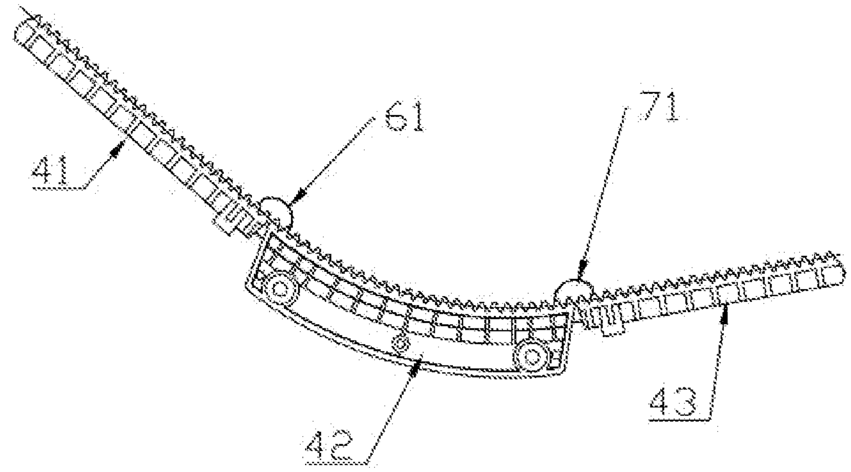
FIG. 9 is a schematic diagram of the reference line of the toothed rack.

As shown in FIGS. 1-9, the three-section guide rail structure of a massage chair includes a backrest guide rail 1, a transition guide rail 2, and a seat guide rail 3. One end of the transition guide rail 2 is hinged and matched with the backrest guide rail 1, and the other end of the transition guide rail 2 is hinged and matched with the seat guide rail 3. The backrest guide rail 1 is fixedly provided with a backrest toothed rack 41, the transition guide rail 2 is fixedly provided with a transition toothed rack 42, and the seat guide rail 3 is fixedly provided with a seat toothed rack 43. The hinge point between the backrest guide rail 1 and the transition guide rail 2 is located on the reference line of the backrest toothed rack 41 and the transition toothed rack 42, and the hinge point between the seat guide rail 3 and the transition guide rail 2 is located on the reference line of the seat toothed rack 43 and the transition toothed rack 42. The backrest guide rail 1 is fixedly provided with a first pressing strip 51, which extends into the transition guide rail 2, and the seat guide rail 3 is fixedly provided with a second pressing strip 52, which also extends into the transition guide rail 2.

In this embodiment, the backrest guide rail 1 is hinged and matched with the transition guide rail 2 by a first flat shoulder screw 61 and a first nut 62. The first flat shoulder screw 61 is circumferentially installed on the backrest guide rail 1 and passes through the transition guide rail 2. The first nut 62 is screwed onto the first flat shoulder screw 61 to limit the transition guide rail 2 from detaching from the first flat shoulder screw 61.

In this embodiment, the seat guide rail 3 is articulated and matched with the transition guide rail 2 through the second flat shoulder screw 71 and the second nut 72. The second flat shoulder screw 71 is installed circumferentially on the seat guide rail 3 for positioning, and passes through the transition rail 2. The second nut 72 is rotatably disposed on the second flat shoulder screw 71 to limit the transition guide rail 2 from detaching from the second flat shoulder screw 71.

In this embodiment, the backrest guide rail 1 is provided with a first through-hole 11 for the rod portion of the first flat shoulder screw 61 to pass through, and the backrest guide rail 1 is provided with a first positioning groove 12 that is shaped to match the head of the first flat shoulder screw 61 at the corresponding first through-hole 11. The head of the first flat shoulder screw 61 is inserted into the first positioning groove 12 to limit the first flat shoulder screw 61 from rotating.

In this embodiment, the seat guide rail 3 is provided with a second through-hole 31 for the rod portion of the second flat shoulder screw 71 to pass through, and the seat guide rail 3 is provided with a second positioning groove 32, which is shaped to match the head of the second flat shoulder screw 71, at the corresponding second through-hole 31. The head of the second flat shoulder screw 71 is inserted into the second positioning groove 32 to limit the second flat shoulder screw 71 from rotating.

In this embodiment, the outer side of the transition guide rail 2 is fixedly connected with a support plate 8, one end of the support plate 8 is provided with a first connecting portion 81, and the other end of the support plate 8 is provided with a second connecting portion 82. The first connecting portion 81 is sleeved on the rod portion of the first flat shoulder screw 61 directly or indirectly. The first flat shoulder screw 61 is provided with a first isolation pad 63 on both sides of the first connecting portion 81. The two first isolation pads 63 are both circumferentially connected to the first connecting portion 81, and the first nut 62 is pressed against the first isolation pad 63 located on the outer side through a first gasket 64. The second connecting portion 82 is sleeved on the rod portion of the second flat shoulder screw 71, and two second isolation pads 73 are respectively sleeved on both sides of the second flat shoulder screw 71 in the second connecting portion 82. The two second isolation pads 73 are connected in a circumferential manner with the second connecting portion 82, and the second nut 72 is pressed against the second isolation pad 73 located on the outer side through a second gasket 74.

In this embodiment, one end of the transition guide rail 2 is provided with a first contact surface 21 and a second contact surface 22 on the rotation trajectory of the backrest guide rail 1, and the first contact surface 21 and the second contact surface 22 respectively abut against the backrest guide rail 1. The other end of the transition guide rail 2 is provided with a third contact surface 23 and a fourth contact surface 24 on the rotation trajectory of the seat guide rail 3, and the third contact surface 23 and the fourth contact surface 24 respectively abut against the seat guide rail 3.

The above embodiments are only preferably specific embodiments of the invention, and the usual changes and substitutions made by those skilled in the art within the technical scope of the invention are included in the protection scope of the invention.

What is claimed is:

1. A three-section guide rail structure for a massage chair, comprising: a backrest guide rail, a transition guide rail, and a seat guide rail; one end of the transition guide rail is hinged and matched with the backrest guide rail, and the other end of the transition guide rail is hinged and matched with the seat guide rail; the backrest guide rail is provided with a backrest toothed rack, the transition guide rail is provided with a transition toothed rack, and the seat guide rail is provided with a seat toothed rack; a hinge point between the backrest guide rail and the transition guide rail is located on a reference line between the backrest toothed rack and the transition toothed rack, and a hinge point between the seat guide rail and the transition guide rail is located on a reference line between the seat toothed rack and the transition toothed rack; the backrest guide rail is fixedly provided with a first pressing strip, which extends into the transition guide rail, and the seat guide rail is fixedly provided with a second pressing strip, which extends into the transition guide rail, the backrest guide rail is articulated and matched with the transition guide rail through a first flat shoulder screw and a first nut, the seat guide rail is articulated and matched with the transition guide rail through a second flat shoulder screw and a second nut, the outer side of the transition guide rail is fixedly connected with a support plate, one end of the support plate is provided with a first connecting portion, and the other end of the support plate is provided with a second connecting portion; the first connecting portion is sleeved on the rod portion of the first flat shoulder screw, and the first flat shoulder screw is provided with a first isolation pad on both sides of the first connecting portion; the two first isolation pads are both circumferentially connected to the first connecting portion, and the first nut is pressed against the first isolation pad located on the outer side through a first gasket; the second connecting portion is sleeved on the rod portion of the second flat shoulder screw, and the second flat shoulder screw is provided with a second isolation pad on both sides of the second connecting portion; the two second isolation pads are connected in a circumferential manner with the second connecting portion, and the second nut is pressed against the second isolation pad located on the outer side through a second gasket.

2. The three-section guide rail structure for a massage chair according to claim 1, wherein the first flat shoulder screw is circumferentially positioned and installed on the backrest guide rail; the first flat shoulder screw passes through the transition guide rail, and the first nut is rotatably mounted on the first flat shoulder screw to limit the transition guide rail from detaching from the first flat shoulder screw.

3. The three-section guide rail structure for a massage chair according to claim 2, wherein and the second flat shoulder screw is circumferentially positioned and installed on the seat guide rail; the second flat shoulder screw passes through the transition guide rail, and the second nut is rotatably mounted on the second flat shoulder screw to limit the transition guide rail from detaching from the second flat shoulder screw.

4. The three-section guide rail structure for a massage chair according to claim 2 wherein the backrest guide rail is provided with a first through-hole for the rod portion of the first flat shoulder screw to pass through, and the backrest guide rail is provided with a first positioning groove that is shaped to match the head of the first flat shoulder screw at the corresponding first through-hole; the head of the first flat shoulder screw is inserted into the first positioning groove to limit the first flat shoulder screw from rotating.

5. The three-section guide rail structure for a massage chair according to claim 3 wherein the backrest guide rail is provided with a first through-hole for the rod portion of the first flat shoulder screw to pass through, and the backrest guide rail is provided with a first positioning groove that is shaped to match the head of the first flat shoulder screw at the corresponding first through-hole; the head of the first flat shoulder screw is inserted into the first positioning groove to limit the first flat shoulder screw from rotating.

6. The three-section guide rail structure for a massage chair according to claim 3, wherein the seat guide rail is provided with a second through-hole for the rod portion of the second flat shoulder screw to pass through, and the seat guide rail is provided with a second positioning groove that is shaped to match the head of the second flat shoulder screw at the corresponding second through-hole; the head of the second flat shoulder screw is inserted into the second positioning groove to limit the second flat shoulder screw from rotating.

7. The three-section guide rail structure for a massage chair according to claim 6, wherein the outer side of the transition guide rail is fixedly connected with a support plate, one end of the support plate is provided with a first connecting portion, and the other end of the support plate is provided with a second connecting portion; the first connecting portion is sleeved on the rod portion of the first flat shoulder screw, and the first flat shoulder screw is provided with a first isolation pad on both sides of the first connecting portion; the two first isolation pads are both circumferentially connected to the first connecting portion, and the first nut is pressed against the first isolation pad located on the outer side through a first gasket; the second connecting portion is sleeved on the rod portion of the second flat shoulder screw, and the second flat shoulder screw is provided with a second isolation pad on both sides of the second connecting portion; the two second isolation pads are connected in a circumferential manner with the second connecting portion, and the second nut is pressed against the second isolation pad located on the outer side through a second gasket.

8. The three-section guide rail structure for a massage chair according to claim 3, wherein one end of the transition guide rail is provided with a first contact surface and a second contact surface on the rotation trajectory of the backrest guide rail, and the first contact surface and the second contact surface respectively abut against the backrest guide rail; the other end of the transition guide rail is provided with a third contact surface and a fourth contact surface on the rotation trajectory of the seat guide rail, and the third contact surface and the fourth contact surface respectively abut against the seat guide rail.

9. The three-section guide rail structure for a massage chair according to claim 6, wherein one end of the transition guide rail is provided with a first contact surface and a second contact surface on the rotation trajectory of the backrest guide rail, and the first contact surface and the second contact surface respectively abut against the backrest guide rail; the other end of the transition guide rail is provided with a third contact surface and a fourth contact surface on the rotation trajectory of the seat guide rail, and the third contact surface and the fourth contact surface respectively abut against the seat guide rail.

* * * * *